INVENTORS.
Edwin Singer
BY Ambros Geissler

Blair & Buckles
ATTORNEYS.

BUFFER DATA STORAGE SYSTEM USING A CYCLICAL MEMORY

Filed Sept. 7, 1965 5 Sheets-Sheet 2

BUFFER DATA STORAGE SYSTEM USING A CYCLICAL MEMORY

Nov. 25, 1969 A. GEISSLER ET AL 3,480,931

BUFFER DATA STORAGE SYSTEM USING A CYCLICAL MEMORY

Filed Sept. 7, 1965 5 Sheets-Sheet 4

Nov. 25, 1969 A. GEISSLER ET AL 3,480,931

BUFFER DATA STORAGE SYSTEM USING A CYCLICAL MEMORY

Filed Sept. 7, 1965 5 Sheets-Sheet 5

United States Patent Office 3,480,931

Patented Nov. 25, 1969

3,480,931

BUFFER DATA STORAGE SYSTEM USING A CYCLICAL MEMORY

Ambros Geissler, Wilton, and Edwin Singer, Stamford, Conn., assignors, by mesne assignments, to Vogue Instrument Corp., Plainview, N.Y., a corporation of New York Continuation-in-part of applications Ser. No. 437,781, Mar. 8, 1965, and Ser. No. 484,522, Sept. 2, 1965. This application Sept. 7, 1965, Ser. No. 485,484

Int. Cl. G11b *5/00, 13/00;* G06f *1/00*

U.S. Cl. 340—174.1 22 Claims

ABSTRACT OF THE DISCLOSURE

The disclosed apparatus employs a drum address track to control the read-in and read-out of data in a buffer store consisting of a plurality of drum tracks. A buffer input counter operating in conjunction with address circuitry and the address track locates successive buffer storage locations for recording of each successive data input. Similarly, a buffer output counter operating in conjunction with the address circuitry and the address track locates successive buffer storage locations for read-out. The relative contents of the input and output counters manifest the number of stored data inputs waiting read-out.

This application is a continuation-in-part of applicants' copending application for "Automatic Monitoring Systems and Apparatus," Ser. No. 437,781, filed Mar. 8, 1965, now Patent No. 3,344,408, and also applicants' copending application for "System and Apparatus For Addressing A Cyclical Memory By The Stored Contents Thereof," Ser. No. 484,522, filed Sept. 2, 1965, now Patent No. 3,387,277. All of these applications are assigned to a common assignee. The disclosures of these two copending applications are specifically incorporated herein by reference.

The present invention relates to a buffer storage system adapted to accept random data inputs at one data rate, temporarily store the data on a storage medium, and then output the data at another data rate to an output device, on request. Apparatus of the invention operates to control the transfer of data into the buffer storage system such that the data is stored in a cyclical memory according to the order received. Additional apparatus of the invention operates to control the transfer of data out of the cyclical memory in the same order in which the data was transferred in, i.e., on a first in, first out basis.

Such a buffer storage system was broadly disclosed as a transaction register in the above-noted copending applications. This transaction register is used in the automatic production monitoring system disclosed therein to temporarily hold messages randomly read out from a main store area on a magnetic drum until an output device, typically a teletypewriter, becomes available. Since the messages contain certain data, termed dynamic data, which is changing at random, temporary or buffer storage means are necessary to preserve the data content of the messages at a particular time of interest until an output device is made available to print out the message in a readily intelligible form. Since a magnetic drum, an economical memory for large storage capacity use, is already being employed in the systems of the copending applications as the main store for accumulating dynamic and static production data pertaining to the large plurality of machine stations, economy dictates that the transaction register also use a portion of the drum area for the buffer storage of messages.

It will be appreciated that a rotating magnetic drum, being a cyclic memory in the sense that the stored data revolves with the drum, presents considerable problems of synchronization. That is, the recording of data on the magnetic drum must be timed relative to the drum rotation so as to avoid the obliteration of previously recorded data. Similarly, the readout of recorded data must be timed relative to the drum rotation so that the data is retrieved from the buffer store in an orderly fashion. Orderly data retrieval from the buffer storage drum area requires that the data be initially recorded in an orderly fashion. This synchronizing of the recording and readout operations in a cyclical memory is sometimes referred to in the art as "addressing" a cyclical memory.

Many buffer storage systems do not employ cyclical memory units and thus are not confronted with addressing considerations. Typical examples of those employ incrementally stepped punched paper tape or magnetic tape as the storage medium. The tape is stepped past a recorder for each data recording. The same tape bearing the recorded data then runs to a reader which reads out the data, on request, as the tape is again stepped. The stored content of the buffer is carried by the loop of tape between the recorder and reader. Thus, the data is automatically retrieved from the buffer store on a first in, first out basis, typically the desired data retrieval basis.

Like those buffer storage systems employing a storage medium in the form of a tape, a cyclical memory, and particularly a magnetic drum, can provide a very large storage capacity at a very low cost per storage unit. However, as the storage capacity of a cyclical memory used as a buffer store is increased, so do the addressing problems.

Another problem encountered when using a cyclical memory such as a magnetic drum as a buffer store is in being able to tell when the cyclical memory is filled to capacity, partially filled, or empty of stored data. When using a tape as a buffer storage medium, one merely observes the extent of the tape loop between the recorder and the reader to determine the data content of the buffer.

Accordingly, an object of the present invention is to provide a buffer storage system capable of storing large quantities of data.

An additional object of the invention is to provide a buffer storage system of the above character which employs a cyclical memory as the data storage medium.

A further object is to provide a buffer storage system of the above character wherein the data storage medium is a magnetic drum.

Another object is to provide a buffer storage system of the above character employing apparatus for addressing the magnetic drum so as to record input data in a predetermined orderly fashion. A related object is to provide a buffer storage system of the above character employing apparatus for independently addressing the magnetic drum such that data is both recorded and read out in a predetermined orderly fashion.

A yet further object of the present invention is to provide a buffer storage system of the above character in which data is read out in a fashion corresponding to the fashion in which the data was originally recorded.

Still another object of the present invention is to provide a buffer storage system of the above character which includes apparatus operating to indicate the extent to which the magnetic drum is filled with recorded data.

A further object of the invention is to provide a buffer storage system of the above character which is safeguarded against erroneous operation, efficient in operation, simple in design, and which can temporarily store large quantities of data economically.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

GENERAL DESCRIPTION

Figure 1:
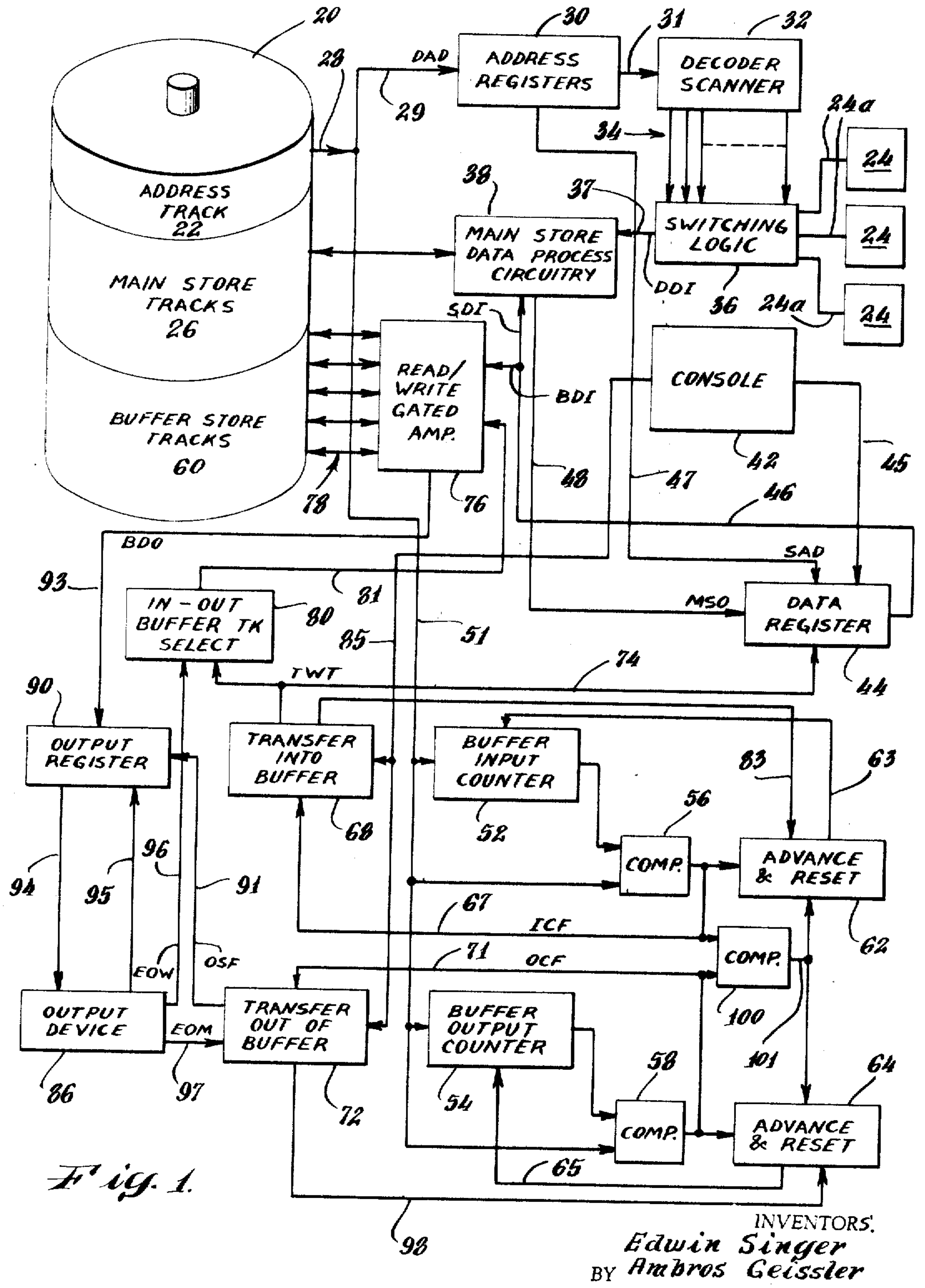
FIGURE 1 is an overall block diagram of an embodiment of the invention employed in conjunction with an automatic production monitoring system.

A general understanding of the present invention may be gained from reference to FIGURE 1 which discloses an overall block diagram of an embodiment of the buffer storage system of the invention as used in conjunction with automatic production monitoring system disclosed in the above-noted copending applications. As disclosed in these copending applications, static and dynamic production data are accumulated in a cyclical memory, such as a magnetic drum 20. The drum 20 includes at least one address track 22 in which are recorded discrete address words, one corresponding to each of a plurality of machine stations 24. The accumulated static and dynamic data for the individual machine stations 24 are recorded in a plurality of main store tracks, generally indicated at 26, on the drum 20. The individual address words DAD are read from the drum address track 22 in serial repeating sequence as the drum 20 rotates by a read head 28. The address words DAD are fed in corresponding repeating sequence over an electrical connection 29 to address registers 30. Each address word DAD is then read out over an electrical connection 31 to a decoder-scanner 32. The decoder-scanner 32 operates to decode each address word DAD so as to energize a particular one of a plurality of scanner output lines, generally indicated at 34. The scanner output lines 34 are connected in switching logic circuitry 36 so as to interrogate the individual machine stations 24 by sampling the signal conditions appearing on input lines 24*a* connected from the individual machine stations 24 to the switching logic circuitry. The connections of the scanner output lines 34 in the switching logic circuitry 36 is such that the machine station 24 corresponding to the address word DAD read into the decoder-scanner 32 is interrogated by the energized one of the scanner output lines. Thus, as each address word DAD is processed in repeating sequence, the machine stations 24 are interrogated in corresponding repeating sequence to develop serial dynamic data inputs DDI appearing on line 37. The dynamic data inputs DDI on line 37 are applied to main store data processing circuitry 38 operating to update the accumulated dynamic data stored in the main store tracks 26.

The decoder-scanner 32, the switching logic circuitry 36, and the main store data processing circuitry 38 are preferably constructed in the manner disclosed in copending application, Ser. No. 437,781. The address registers 30 are preferably constructed in the manner disclosed in the later filed copending application.

While the monitoring (interrogation) of the individual machine stations 24 and the accumulation of dynamic data in the dynamic data tracks of the main store tracks 26 is being carried out automatically, the other operating modes of the system are manually initiated at a console 42. In one of the various operating modes, a static data word or a console correction of a dynamic data word is generated at the console 42 and entered into a data register 44 over an electrical connection 45. Then under the control of a drum addressing signal, termed selected address signal SAD, derived by the address registers 30 and supplied on line 47, the data word entered in the data register 44 is read out over an electrical connection 46 as a static data input SDI to the main store data processing circuitry 38. This static data input word SDI is recorded in an appropriate word location in one of the main store tracks 26 addressed by the selected address signal SAD. The apparatus operating to develop this selected address signal SAD is preferably constructed in the manner disclosed in the above-noted later filed copending application. As also disclosed in this copending application, a selected address signal SAD is used to control the data register 44 to accept static/dynamic data words read out from the main store tracks 26 as main store outputs MSO appearing on line 48. The selected address signal SAD insures that only a selected one of the main store output words MSO is read into the data register 44.

It will be appreciated that the foregoing description of the production monitoring system has been generalized in the interests of simplicity and brevity. For a detailed disclosure, reference should be had to the above-noted copending applications. The overall system has been generally disclosed herein for the purpose of facilitating an understanding of the disclosed embodiment of the present invention as directed to a specific data processing application. It will be understood that the principles and teachings of the present invention are applicable to a wide variety of data processing situations.

Each of the above-noted copending applications generally disclose the use of a transaction register as buffer storage means for temporarily holding messages comprising a plurality of static and dynamic data words until an output device becomes available to accept transmission of such messages. Each message corresponds to a particular machine station 24 inasmuch as the included static and dynamic data words each correspond to the same particular machine stations. As also disclosed in the above-noted copending applications, the transaction register or buffer employs tracks on the magnetic drum as the storage medium. In the disclosed embodiment of the present invention, the buffer storage medium is comprised of a plurality of drum tracks 60. Inasmuch as tracks on a rotating magnetic drum comprises a cyclical memory, the recording of data in the buffer storage tracks must be synchronized with the rotation of the magnetic drum in order that data words will be recorded in empty word locations therein. Similarly, the readout of data words must be synchronized with the rotation of the magnetic drum in order that the data words are read out to the output device in a proper word and message format.

According to the present invention seen in FIGURE 1, the address words DAD read from the drum address track 22 for application over electrical connection 29 to the address registers 30 are also applied over electrical connection 51 to the input of a buffer input counter 52 and a buffer output counter 54. The drum address words DAD are also applied to one input of a first comparator 56 for comparison with the address word content of the buffer input counter 52, and to one input of a second comparator 58 for comparison with the address word content of the buffer output counter 54.

When the buffer store tracks 60 on the magnetic drum 20 are completely empty of recorded data words, the buffer input counter 52 is controlled from an advance and reset circuit 62 over electrical connection 63 to accept and hold the first address word DAD–00 read from the drum address track 22 in each cycle of the magnetic drum 20. For purposes of the present disclosure, it will be assumed that all of the address words are recorded serially in a single drum address track 22 and thus the first address word DAD–00 is read out at the beginning of each drum spin. Similarly, the first address word DAD–00 is read into and held in the buffer output counter 54 as controlled by a second advance and reset circuit 64 over electrical connection 65. With the first address word DAD–00 held in buffer input counter 52, each time this address word is read out from the drum address track 22 at the beginning of each successive drum spin, the comparator 56 develops an output signal ICF which is applied over line 67 to a transfer into buffer circuit 68. Similarly, comparator 58 develops an output OCF each time the first address word DAD–00 held in the buffer output counter 54 compares with the same address word read out in each successive drum spin. This comparator output OCF is applied over line 71 to a transfer out of buffer circuit 72.

In transferring static/dynamic data words from the main store tracks 26 to the buffer store tracks 60, each selected word is read out as a main store output MSO and entered into the data register 44 under the control of a selected address signal SAD. The transfer into buffer circuit 68 sends a transfer word signal TWB to the data register 44 over line 74 in response to receipt of the comparator output signal ICF. The transfer word signal TWB controls the data register 44 to read out the data word on line 46 as a buffer data input word BDI to a read/write gated amplifier circuit 76. A plurality of read/write heads 78, each one operating in a different buffer store track 60, share the common read/write gated amplifier circuit 76.

An in-out buffer track select circuit 80, also operating in response to the transfer word signal TWB, appropriately conditions the read/write gated amplifier circuit 76 over a control cable 81 such that each data word read out from the data register 44 as a buffer data input word BDI is recorded in an appropriate buffer store track 60. The comparator output signal ICF by the way of the transfer into buffer circuit 68 times the read out of the data register 44 such that the first message recorded in the buffer store track 60 is recorded in a predetermined first message slot as addressed by the first address word DAD–00. Once the first message has been completely transferred from the main store tracks 26 to the buffer store tracks 60, the transfer into buffer circuit 68 signals the advance and reset circuit 62 over electrical connection 83. The advance and reset circuit 62 operates in response thereto to control the buffer input counter 52 over electrical connection 63 to accept and hold the second address word DAD–01 read from the drum address track 22 immediately after the first address word DAD–00 in each drum spin. As a consequence, the comparator output signal ICF now appears each time this second address word DAD–01 is read from the drum address track 22. This comparator output signal ICF then controls the transfer of data words making up a second message from the main store tracks 26 to the buffer store tracks 60 such that this second message is recorded in a predetermined second message slot addressed by address word DAD–01.

The same operation repeats each time a message is to be transferred from the main store tracks 26 to the buffer store tracks 60. The decision to make such a transfer is made at the console 42 which supplies a control signal over control cable 85 to the transfer into buffer circuit 68.

All the while that the buffer input counter 52 and the transfer into buffer circuit 68 have been operating to control the transfer of successive messages from the main store tracks 26 to the buffer store tracks 60, the buffer output counter 54 has continued to hold the first address word DAD–00. The comparator output signal OCF is developed at the beginning of each drum revolution to locate the first message slot in the buffer store tracks 60 storing the first message recorded under the control of the comparator output signal ICF.

When it is desired to output messages recorded in the buffer store tracks 60 to an output device 86, the console 42 signals the transfer out of buffer circuit 72 over control cable 85. The read/write gated amplifier circuit 76 is normally conditioned from the in-out buffer track select circuit 80 over control line 81 to select the buffer store track 60 in which is recorded the first word of the first message to be transmitted to the output device 86.

This normal conditioning of the read/write gated amplifier circuit 76 to a readout mode is interrupted by the transfer word signal TWB from the transfer into buffer circuit 68 occurring only when a buffer data input word BDI is to be recorded in the buffer store tracks 60. This provides for more efficient time sharing of the read/write gated amplifier 76 between buffer input and output since messages may be transferred in much more rapidly than they can be transferred out when using a slow data rate output device 86 such as a teletypewriter. At the same time, the comparator output signal OCF, addressing the first message slot, is applied over electrical connection 71 to the transfer out of buffer circuit 72. This circuit 72, upon receipt of the signal OCF, sends a signal OSF over line 91 to condition an output register 90 to accept the first word of the first message when it appears as a buffer data output BDO on line 93 connected from the read/write data amplifier 76. From the output register 90 the first word of the first message is transmitted over cable 94 to the output device 86 in response to request signals sent from the output device to the output register over line 95.

The output register 90 is preferably constructed to include a shift register into which is shifted each word of the message to be outputted. Once the data word is entered in this shift register under the control of the signal OSF, the individual digits of the word are transmitted serially over cable 94 to a teletypewriter (output device) most significant digit first. This is accomplished in the manner disclosed in the above-identified later filed copending application by successively shifting the digits of the word into a most significant digit position in the shift register from which they are transmitted to the output device 86.

Once the first word has been transmitted to the output device 86, an end of word signal EOW is transmitted back over line 96 to the in-out buffer track select circuit 80. This circuit then operates to select the buffer store track in which is recorded the second word of the first message. This second word is then transferred to the output register 90 for transmission to the output device 86. After the last word of the first message has been transmitted to the output device 86, an end of message signal EOM is transmitted back over line 97 to the transfer out of buffer circuit 72. In response, the transfer out of buffer circuit 72 signals the advance and reset circuit 64 over electrical connection 98 which, in turn, controls the buffer output counter 54 over line 65 to shift in the second address word DAD–01.

To detect when all of the messages recorded in the buffer store tracks 60 have been transmitted to the output device 86, the comparator output signals ICF and OCF are compared in a comparator 100. If these two comparator output signals are aligned in time, meaning that the next message to be transferred from the main store tracks 26 to the buffer store tracks 60 is to be recorded in the same message slot from which the next message is to be read out for transmission to the output device 86, it will be seen that the buffer store tracks 60 are empty. When this condition is detected, the comparator 100 produces an output signal on output line 101 which is applied to both advance and reset circuits 62 and 64. Each of these circuits 62 and 64 operate to reset their respective buffer counters 52 and 54, respectively, such that the first address word DAD–00 is accepted and retained.

From the foregoing general description, it will be seen that the address words DAD recorded in the drum address track 22 serves not only a means by which the main store data tracks 26 are addressed but also the means by which the message slots in the buffer store tracks 60 are addressed. Thus, the messages transferred from the main store tracks 26 to the buffer store tracks 60 are recorded in predetermined message locations depending upon the order in which they are transferred. The messages are transferred from the buffer store track 60 to the output register 90 for transmission to the output device 86 in the same order, i.e., on a first in, first out basis.

It will be understood that the address words, DAD, when used to address message slots in the buffer store tracks 60, do not necessarily correspond to particular machine stations 24 as they do when addressing the main store tracks 26. That is, the address words DAD address the buffer store tracks 60 according to the order of message transfer which need not, and typically does not, correspond to the order of machine station interrogation.

SPECIFIC DESCRIPTION

Drum layout

Figure 2:
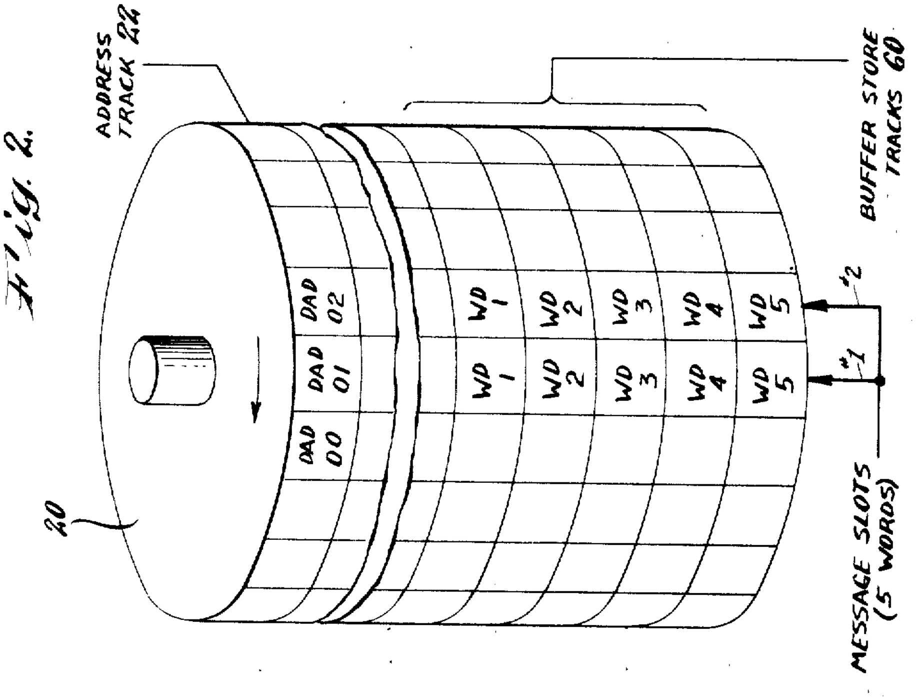
FIGURE 2 is a layout of a portion of the magnetic drum of FIGURE 1 showing the time alignment of buffer store message slots relative to word slots in which are recorded associated address words DAD.

The physical layout of the magnetic drum 20 showing the relative locations of the address words DAD and the message slots in the buffer store tracks 60 can be seen in FIGURE 2. For purposes of the present disclosure, it is assumed that the address words DAD, as well as all of the static/dynamic data words, are multidigit words processed in serial binary coded decimal (BCD) format. Each digit is coded in the 1, 2, 4, 8, P (parity) format. The words are recorded and read out from the magnetic drum 20 least significant digit, least significant bit, first. This is the same code format by which the words are handled in the above-noted copending application.

It will be further assumed that the circumference of the drum 20 is such that 100 seven digit words with each digit made up of five binary bits may be recorded in a single drum track. Thus, each address word DAD is made up of only two binary coded decimal digits for the 100 address word DAD–00 through DAD–99. As disclosed in both of the above-noted copending applications, the least signficant digit of each address word DAD is recorded in the third digit slot of each word slot while the most significant digit is recorded in the fourth digit slot of each word slot.

The address word DAD–00 is arbitrarily taken as the first address word to be read from the drum address track 22 at the beginning of each drum revolution. Address words DAD–01, DAD–02, etc., follow in sequence. Inasmuch as a particular address word DAD, being recorded serial by binary bit, is not interpretable until it is completely read out from the drum address track 22, each address word serves to address word and message slots in the main store tracks 26 and the buffer store tracks 60 which are aligned in time with the next address word to be read out. Thus, address word DAD–00 serves to address the first message slot in the buffer store track 60 aligned in time with the address word DAD–01 recorded in the drum address track 22. As shown in FIGURE 2, each message is comprised of five data words; each word being recorded on a separate buffer store track 60. Thus, there is a buffer store track 60 for each word making up a message.

It will be appreciated that the physical relationship of the message slots and the associated address words DAD shown in FIGURE 2 is valid only for the situation where the address track read head 28 and the buffer store read/write heads 78 are physically vertically aligned. It will be understood that this physical head alignment is not necessary since it is only necessary that the word slots of a particular message slot arrive at their respective read/write heads 78 during the word time immediately following the word time in which the associated address word DAD is read out by the address track read head 28.

Buffer input logic

Figure 3:
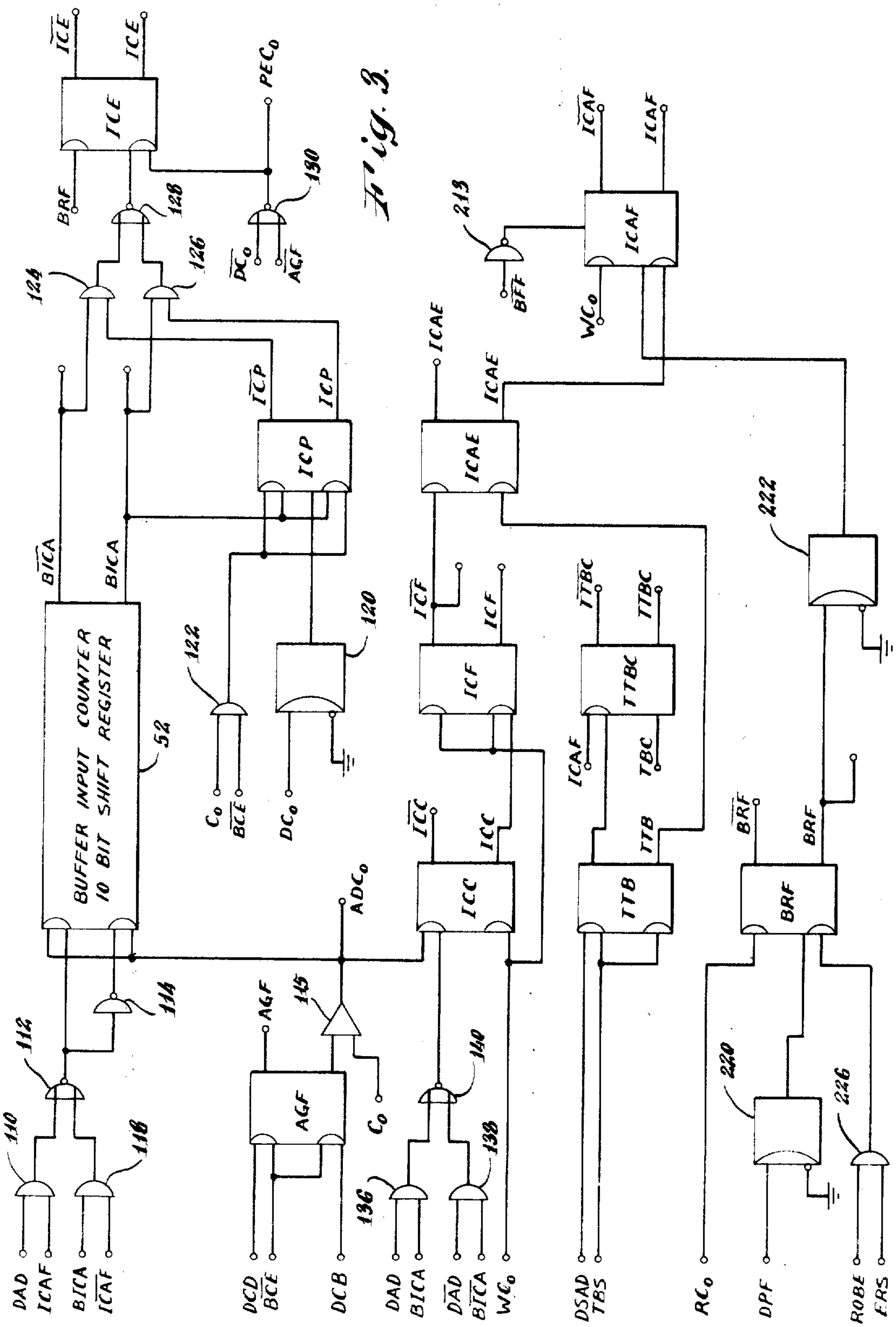
FIGURE 3 is a detailed logic block diagram of a portion of the buffer input logic including the buffer input counter, the input counter comparator, a portion of the advance and reset circuit, and a portion of the transfer into buffer circuit, all of FIGURE 1.

Buffer input logic circuitry which includes the buffer input counter 52, the comparator 56, a portion of the advance and reset circuit 62, and a portion of the transfer into buffer circuit is specifically disclosed in FIGURE 3. The buffer input counter 52 is constructed as a shift register comprising ten flip-flop stages. Each stage of the buffer input counter is adapted to hold one of the ten binary bits representing the two digits of an address word DAD.

In order to enter an address word DAD into the buffer input counter 52, the individual binary bits read serially from the drum address track 22 are applied as one input to an AND gate 110. The other input to AND gate 110 is provided by the set output ICAF from an input counter advance flip-flop ICAF. The output of AND gate 110 is applied as one input to a NOR gate 112 whose output is applied directly to the gated reset input and through an inverter 114 to the gated set input of the first flip-flop stage of the buffer input counter 52.

In order to shift the address word binary bit by binary bit into the buffer input counter 52, an address gate flip-flop AGF, which was disclosed in the above-noted applications, is controlled by digit timing signals DCD, DCB and bit timing signal $\overline{BCE}$ so as to be set for the third and fourth digit times of each address word time. The set output AGF of the address gate flip-flop AGF enables a gated amplifier 115 to pass bit clock pulses $C_0$ as address clock pulses $ADC_0$. These clock pulses $ADC_0$ are applied to the gated set and reset inputs of each of the flip-flop stages of the buffer input counter 52 for shifting in an address word DAD gated through AND gate 110.

As will be seen from the description of the operation of the input counter advance flip-flop ICAF, its set output ICAF enables AND gate 110 only for a single word time to enter an address word DAD into the buffer input counter 52. Otherwise, the input counter advance flip-flop ICAF is reset and its reset output $\overline{ICAF}$ enables an AND gate 118. The other input to AND gate 118 is the set output BICA from the last flip-flop stage of the buffer input counter 52. The output of AND gate 118 is applied as the second input to NOR gate 112. Thus, with AND gate 118 enabled and AND gate 110 necessarily disabled, an address word DAD is recirculated from the output of the buffer input counter 52 back to its input through AND gate 118 once during each address word time by the address clock pulses $ADC_0$.

As an address word DAD is recirculated in the buffer input counter 52, an input counter parity flip-flop ICP monitors the output BICA for parity error. Each digit of the address word DAD is recirculated in the buffer input counter 52 least significant bit first. The last bit of each digit appearing at the output BICA of the buffer input counter 52 is the parity bit P which is either a binary one or a binary zero in order to make the number of binary one bits in each digit odd.

The output BICA from the buffer input counter 52 is also applied to the gated set and reset inputs of the input counter parity flip-flop ICP. Digit clock pulses $DC_0$ applied to the A.C. input of a permanently enabled A.C. gate 120 trigger the flip-flop ICP to its set condition at the beginning of each digit time. The flip-flop ICP is clocked by bit clock pulse $C_0$ gated through an AND gate 122 during the first four bit times of each digit time. With the flip-flop ICP set at the beginning of each digit time, its state is changed for each binary one bit read out from the buffer input counter 52 during each digit time. At the end of the fourth bit time of each digit time, if the flip-flop ICP is in its set condition, the number of binary one bits in the digit is even. On the other hand, if the flip-flop ICP is reset, the number of binary one bits in the digit is odd. AND gate 122 is disabled by bit timing signal $\overline{BCE}$ so that the flip-flop ICP is not clocked during the fifth bit time of each digit time.

The reset output $\overline{ICP}$ of flip-flop ICP is gated with the reset output $\overline{BICA}$ from the last flip-flop stage of the buffer input counter 52 in an AND gate 124. Similarly, the set outputs ICP and BICA are gated together in an AND gate 126. The outputs of AND gates 124 and 126 are gated together in a NOR gate 128 whose output is applied as one input to the gated set input of an input counter error flip-flop ICE. Digit clock pulses $\overline{DC_0}$ and the reset output $\overline{AGF}$ of the address gate flip-flop AGF are gated together in a NOR gate 130 so as to develop parity error clock pulses $PEC_0$ at the end of each address word digit time. These parity error clock pulses $PEC_0$ are also applied to the gated set input of the input counter error flip-flop ICE.

It is seen that the outputs BICA, $\overline{BICA}$ and the outputs ICP, $\overline{ICP}$ are compared in AND gates 124 and 126 during the parity bit time of each digit. The outputs ICP, $\overline{ICP}$ indicate what the parity bit should be while the outputs BICA, $\overline{BICA}$ indicate what the parity bit of each address word digit actually is for each recirculation in the buffer input counter 52. If these outputs compare properly, one of the AND gates 124 and 126 is enabled to apply a logical one to an input of NOR gate 128. Its output goes to a logical zero to disable the gated set input of the input counter error flip-flop ICE. It will be seen that if there is a parity error such as would occur when a binary bit is lost during recirculation, the AND gates 124 and 126 are both disabled, and the output from the NOR gate 128 is a logical one to enable the gated set input of the flip-flop ICE. This flip-flop is then triggered to its set condition by a parity error clock pulse $PEC_0$ and its set output ICE, being a logical one, is used to indicate to the console operator that a parity error has been detected. In response to a parity error indication, the console operator immediately discontinues the transfer of messages from the main store tracks 26 into the buffer store tracks 60 and initiates message transmissions from the buffer store tracks of all previously recorded messages to the output device 86 when available. This recommended procedure is instituted when a parity error is detected since a particular message slot in the buffer store tracks 60 can no longer be properly addressed by the erroneous address word DAD being recirculated in the buffer input counter 52. Once the buffer store tracks 60 are emptied of all messages, the input counter error flip-flop ICE is reset by the set output BRF from a buffer reset flip-flop BRF whose operation is described below.

The outputs of BICA and $\overline{BICA}$ of the buffer input counter 52 constituting the recirculated address word DAD are compared binary bit by bit with the succession of address words DAD and $\overline{DAD}$ read from the drum address track 22 in AND gates 136 and 138, included in the serial comparator 56 (FIGURE 1). The outputs of AND gates 136 and 138 are gated together in a NOR gate 140 whose output is applied to the gated reset input of an input counter comparator flip-flop ICC. The address clock pulses $ADC_0$ are also applied to the gated reset input of the flip-flop ICC, while word clock pulses $WC_0$ are applied to its gated set input. The set output of the flip-flop is applied to the gated set input of an input counter flip-flop ICF which is clocked by word clock pulses $WC_0$ applied to both its gated set and reset inputs.

At the beginning of each comparison between the address word DAD recirculated in the buffer input counter 52 and an address word DAD read from the drum address track 22, the flip-flop ICC is set by a word clock pulse $WC_0$. As long as there is bit by bit comparison detected by AND gates 136 and 138, the output of NOR gate 140 is a logical zero to disable the gated reset input of the flip-flop ICC. If at the end of an address word comparison, the flip-flop ICC is still set, the input counter flip-flop ICF is set by a word clock pulse $WC_0$ and reset one word time later by the next occurring word clock pulse.

Thus, the flip-flop ICF is set for the word time following the readout of the address word DAD from the drum address track 28 which is also being recirculated in the buffer input counter 52. The set output ICF of the flip-flop ICF is thus a logical one for one word time during each revolution of the drum 20 to locate the message slot in the buffer store tracks 60 associated with the address word recirculated in the buffer input counter 52. Each time a non-comparison between corresponding binary bits of the recirculated address word DAD and an address word DAD read from the drum address track 22, both AND gates 136 and 138 are disabled and the output of NOR gate 140 goes to a logical one to enable the flip-flop ICC to be reset by the next occurring address clock pulse $ADC_0$. With the flip-flop ICC reset during an address word comparison, the flip-flop ICF cannot be set by the next occurring word clock pulse $WC_0$.

When it is desired to transfer a message from the main store tracks 26 to the buffer store tracks 60 by way of the data register 44 (FIGURE 1) the console operator initiates a transfer command signal TBC which sets a transfer to buffer command flip-flop TTBC. In conjunction with the setting of the flip-flop TTBC, a transfer to buffer control signal TBS is generated.

This signal TBS is an operational control signal which goes from a logical one to a logical zero at the beginning of the actual transfer of the first word of a message from an appropriate one of the main store tracks 26 to the data register 44 and remains a logical zero until the last word of a message has been transferred from the data register into an appropriate one of the buffer store tracks 60. When this transfer to buffer control signal TBS goes from a logical one to a logical zero at the very beginning of a message transfer, a transfer to buffer flip-flop TTB is set. Its set output TTB is applied to the gated set input of an input counter advance enable flip-flop ICAE. The reset output $\overline{ICF}$ of the input counter flip-flop ICF is applied to the gated reset input of flip-flop ICAE. The set output ICAE of the input counter advance enable flip-flop ICAE is applied to the gated set input of the input counter advance flip-flop ICAF.

The flip-flop ICAF is reset in order to recirculate an address word DAD in the buffer input counter 52. After a complete message has been transferred from the main store tracks 26 to the buffer store tracks 60, the transfer to buffer control signal TBS returns to a logical one and the transfer to buffer flip-flop TTB is reset by the next occurring delay selected address signal DSAD. As disclosed in the above-noted later filed copending application, the delayed selected address signal DSAD is used to control the shifting of selected data words read from the main store track 60 into the data register 44. When the transfer to buffer flip-flop TTB resets, its set output TTB goes from a logical one to a logical zero and sets the flip-flop ICAE.

Inasmuch as the address word DAD associated with the message slot in the buffer store tracks 60 which has just been filled from the data register 44 (FIGURE 1) is still being recirculated in the buffer input counter 52, the flip-flop ICAE is reset by the flip-flop ICF when set in response to the next address word comparison. Thus, the flip-flop ICAE is first set and then reset the first time the flip-flop ICF is set after a complete message has been transferred. The set output ICAE of the flip-flop ICAE is effective upon executing a logical one to zero transition to set the input counter advance flip-flop ICAF. Flip-flop ICAF is reset one word time later by a word clock pulse $WC_0$. Thus, the flip-flop ICAF is set during the same word time that the flip-flop ICF is set; i.e. the word time during which the next address word DAD in sequence from the one comparing with the recirculated address word is being read from the drum address track 22. The reset output $\overline{ICAF}$ of the flip-flop ICAF disables AND gate 118 and the set output ICAF enables AND gate 110 to read this next address word DAD occurring in sequence into the buffer input counter 52. After the flip-flop TTB resets, flip-flop TTBC resets when the flip-flop ICAF resets.

It will thus be seen that once a complete message has been transferred from the main store tracks 26 to the buffer store tracks 60 under the control of the flip-flop ICF, the input counter advance flip-flop ICAF is conditioned to enable the next address word DAD to be read into the buffer input counter 52. Thereafter, this next address word DAD is recirculated in the buffer input counter 52 and the next message slot in the buffer store tracks 60 to be filled by the next message transfer is addressed by the set output ICF upon operation of the input counter flip-flop ICF.

Figure 6:
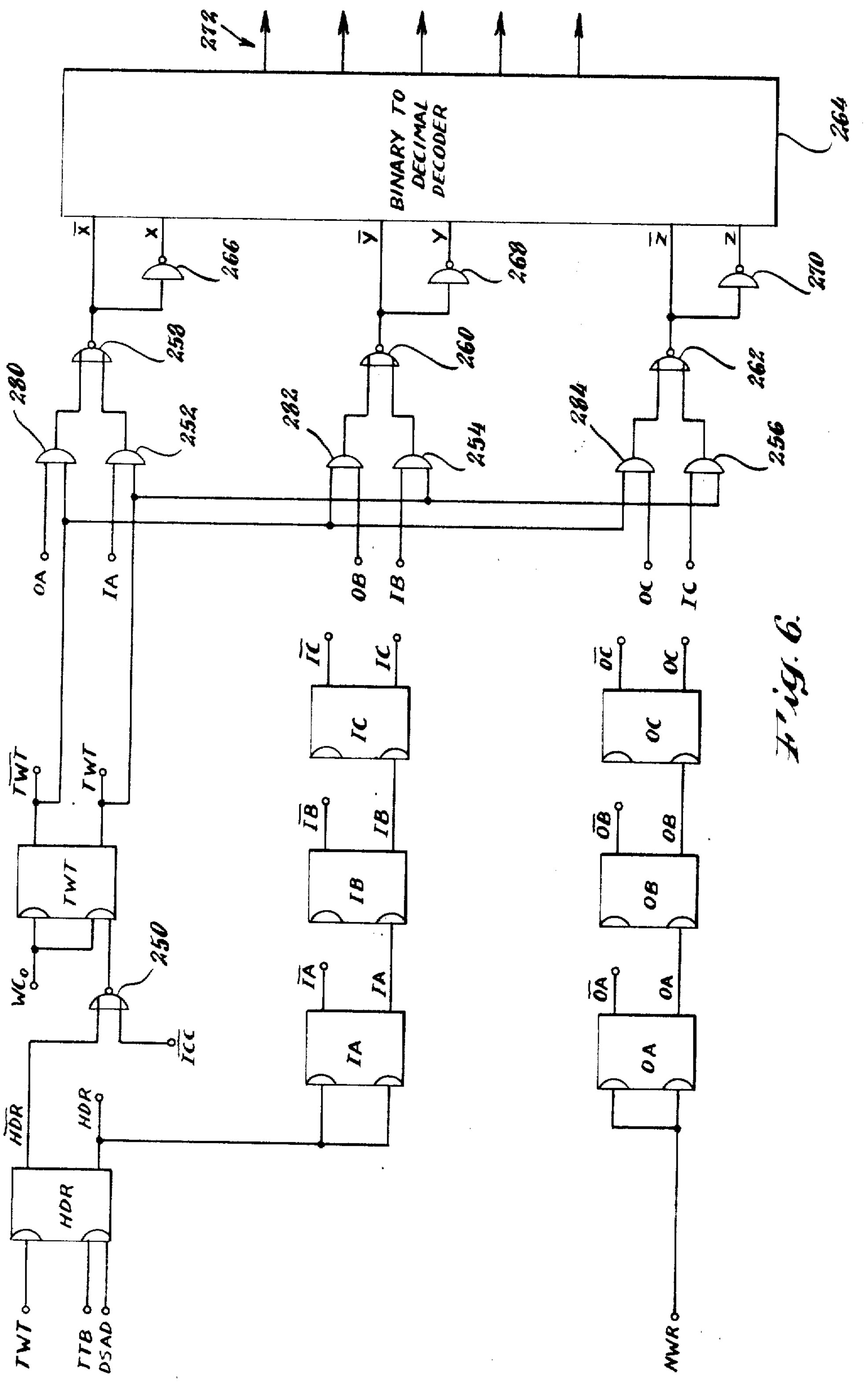
FIGURE 6 is a detailed logic block diagram of a portion of the transfer into buffer circuit and the in-out buffer track select circuit, both of FIGURE 1.

The portion of the transfer into buffer circuit 68 (FIGURE 1) operating on receipt of the buffer address signal ICF developed by the input counter flip-flop ICF (FIGURE 3) to control each data word transfer from the data register 44 is shown in FIGURE 6. Referring now to FIGURE 6, a data register flip-flop HDR is operated each time a data word is read from the main store tracks 26 into the data register 44 (FIGURE 1) in preparation for transfer to the buffer store tracks 60. As described in connection with FIGURE 3, the transfer to buffer flip-flop TTB is set by the transfer to buffer signal TBS. The set output TTB of flip-flop TTB is thus a logical one to enable the gated set input of the data register flip-flop HDR. The selected data word in the message to be transferred is read out from the main store tracks 26 as a main store output MSO and shifted into the data register 44 during the time of the delayed selected address signal DSAD as described in the above-noted later filed copending application. Accordingly, the delayed selected address signal DSAD, applied to the gated set input of the data register flip-flop HDR, sets this flip-flop after the data word has been shifted into the data register 44. The reset output $\overline{HDR}$ of the data register flip-flop HDR is gated with the reset output $\overline{ICC}$ of the input counter comparator flip-flop ICC (FIGURE 3) in a NOR gate 250. The output of NOR gate 250 is applied to the gated set input of a transfer word to buffer flip-flop TWT. Word clock pulses $WC_0$ are applied to both the gated set and reset inputs of the transfer word to buffer flip-flop TWT.

It will thus be seen that after the data register flip-flop HDR is set, the transfer word to buffer flip-flop TWT is set simultaneously with the input counter flip-flop ICF when a data word is to be transferred from the data register 44 as a buffer data input word BDI for recording in one of the buffer store tracks 60. Flip-flop TWT is reset one word time later by a word clock pulse $WC_0$. The set output TWT of flip-flop TWT, when a logical one, gates shift pulses to the data register 44 in order that the data word is read out at the proper time to be recorded in the message slot in one of the buffer store tracks 60 addressed by the output ICF. The set output TWT is also effective to reset the data register flip-flop HDR when the flip-flop TWT is reset.

Buffer output logic

Figure 4:
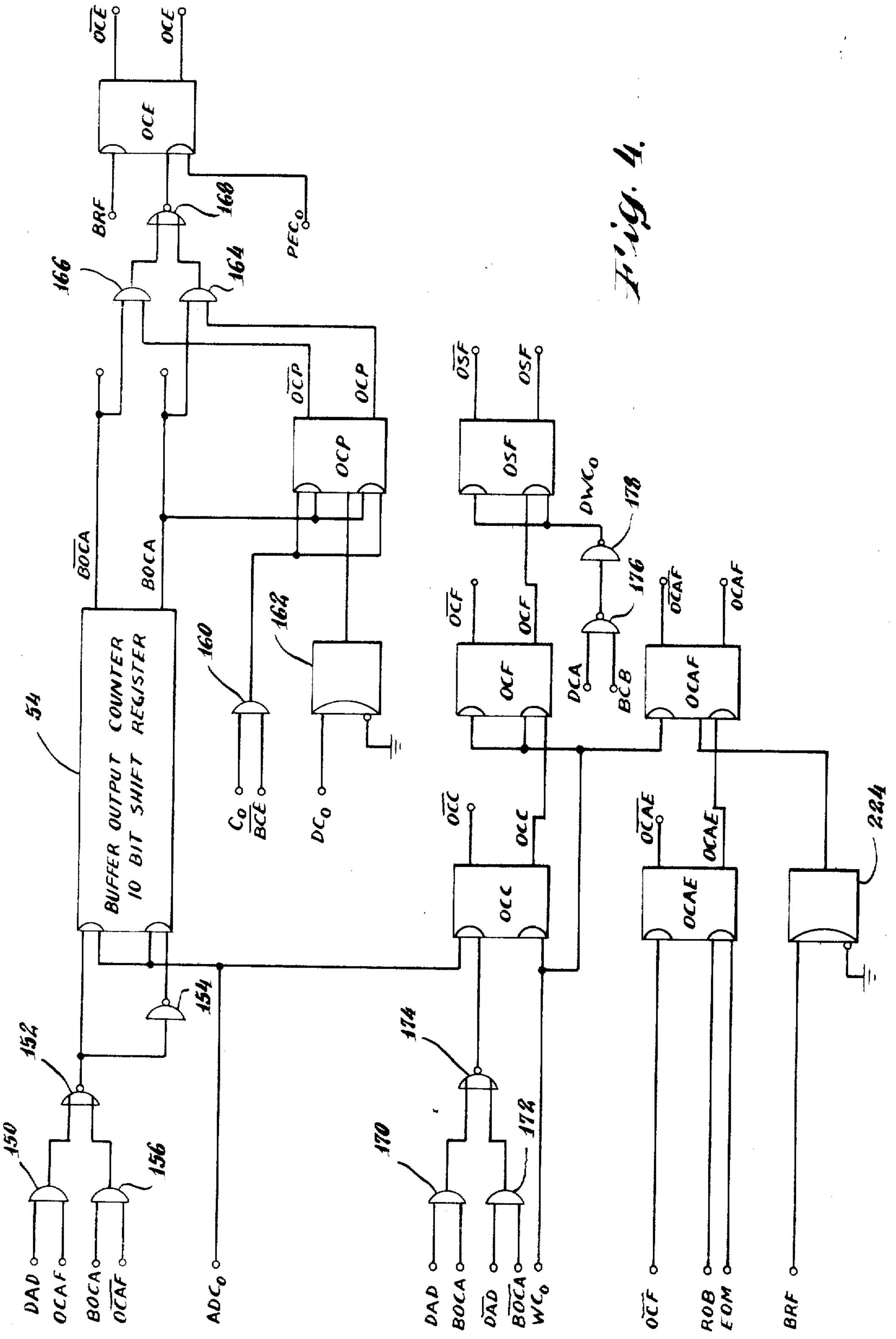
FIGURE 4 is a detailed logic block diagram of a portion of the buffer output logic including the buffer output counter, the output counter comparator, a portion of the advance and reset circuit, and a portion of the transfer out of buffer circuit, all of FIGURE 1.

The buffer output logic which includes the buffer output counter 54, the comparator 58, a portion of the advance and reset circuit 64, and the transfer out of buffer circuit 72 (FIGURE 1) is shown in detail in FIGURE 4. It will be observed that the buffer output logic is constructed in substantially the same manner as the buffer input logic of FIGURE 3. Accordingly, address words DAD are gated through an AND gate 150 and a NOR gate 152 to the buffer output counter 54. The buffer output counter 54, like the buffer input counter 52 (FIGURE 3), is constructed as a ten bit shift register comprising ten flip-flop stages. The output of NOR gate 152 is supplied directly to the gated reset input and through an inverter 154 to the gated set input of the first flip-flop stage of the buffer output counter 54. An address word DAD is shifted into the buffer output counter 54 by address clock pulses $ADC_0$ applied to the gated set and reset inputs of each flip-flop stage. The set output BOCA from the last flip-flop stage of the buffer output counter 54 is fed back as one input to an AND gate 156 for recirculating an address word DAD in the buffer output counter 54. The AND gates 150 and 154 are controlled by the set output OCAF and the reset output $\overline{OCAF}$ of an output counter advance flip-flop OCAF. The flip-flop OCAF in FIGURE 4 operates in the same manner as the input counter advance flip-flop ICAF in FIGURE 3 to first enter an address word DAD into the buffer output counter 54 and thereafter recirculate the address word during each address word time.

As an address word DAD is being recirculated in the buffer output counter 54, an output counter parity flip-flop OCP monitors each digit of the recirculated address word for parity error. Accordingly, the set output BOCA from the last flip-flop stage of the buffer output counter 54 is connected to the gated set and reset inputs of flip-flop OCP. This flip-flop is clocked from the output of an AND gate 160 for the first four bit times of each address word digit recirculated in the buffer output counter. The inputs to AND gate 160 are bit clock pulses $C_0$ and bit timing signal $\overline{BCE}$. Thus, the AND gate 160 is disabled during the fifth or parity bit time of each address word digit. At the beginning of each address word time, the flip-flop OCP is set from the output of an A.C. gate 162 having as its A.C. input digit clock pulses $DC_0$.

In precisely the same manner as the input counter parity flip-flop ICP (FIGURE 3), the output counter parity flip-flop OCP is set at the beginning of each address word digit time, and its state is changed for each binary one bit of the address word digits recirculated in the buffer output counter 54. The set output OCP and the reset output $\overline{OCP}$ of the flip-flop OCP are compared with the set output BOCA and the reset output $\overline{BOCA}$ of the last flip-flop stage of the buffer output counter 54 in a pair of AND gates 164 and 166, respectively. The outputs of AND gates 164 and 166 are gated together in NOR gate 168 whose output is supplied to the gated set input of an output counter error flip-flop OCE. If the parity bit of an address digit recirculated in the buffer output counter 54 is correct, one or the other of the AND gates 164, 166 is fully enabled so as to produce a logical zero output at NOR gate 168. This logical zero output disables the gated set input of flip-flop OCE such that it cannot be set by a parity error clock pulse $PEC_0$ occurring at the end of each digit time of the recirculated address word. On the other hand, if a parity error is detected, the output of NOR gate 168 goes to a logical one and the flip-flop OCE is then set by a pulse $PEC_0$. The set output OCE of the flip-flop OCE, when a logical one, is used to control the energization of a signal indication at the console. In response to a parity error indication in the buffer output logic, the console operator immediately discontinues message transfer into the buffer and initiates message output to the output device 86 to clear the buffer store tracks 60. Once the buffer is cleared, the reset output BRF of a buffer reset flip-flop BRF operates to reset the output counter error flip-flop OCE.

The outputs BOCA, $\overline{BOCA}$ of the buffer output counter 54, during address word recirculation, are compared with each address word output DAD, $\overline{DAD}$ read from the drum address track 22 in a pair of AND gates 170 and 172. The outputs of AND gates 170 and 172 are gated together in a NOR gate 174 whose output is supplied to the gated reset input of an output counter comparator flip-flop OCC. The flip-flop OCC is set at the beginning of each address word time by word clock pulses $WC_0$. The flip-flop OCC in the buffer output logic operates in the same manner as the flip-flop ICC (FIGURE 3) in the buffer input logic. Thus, if there is a non-comparison between corresponding binary bits of the recirculated address word DAD and the address words DAD read from the drum address track 22, the flip-flop OCC is reset by an address clock pulse $ADC_0$. On the other hand, if there is complete comparison, the flip-flop OCC is not reset and its set output OCC enables an output counter flip-flop OCF to be set by a word clock pulse $WC_0$. After being set, the flip-flop OCC is reset by the next occurring word clock pulse $WC_0$. Thus, the flip-flop OCF is set for the word time occurring after the same address word DAD recirculated in the buffer output counter 54 is read from the drum address track 22 during successive revolutions of the drum 20.

It will thus be seen that the set output OCF of the flip-flop OCF, when a logical one, serves to address the message slot in the buffer store tracks 60 in which is recorded the very first message transferred from the main store tracks 26.

As was discussed in the two above-noted copending applications, there is a certain inherent playback delay caused by the inability of the read/write heads 78 (FIGURE 1) to read out a recorded word in the same relative word time during which it was recorded on a previous drum revolution. Accordingly, a second output comparison flip-flop OSF is employed to compensate for this playback delay between the time when a particular recorded data word sweeps past a readout head 78 and the time when the data word is actually available as a buffer data output BDO for transmission to the output device 86. To this end, the set output OCF from the output counter flip-flop OCF is applied to the gated set input of the flip-flop OSF. The flip-flop SOF is clocked by delayed word clock pulses $DWC_0$ applied to its gated set and reset inputs. To develop these delayed word clock pulses $DWC_0$, digit timing signals DCA are gated with bit timing signals BCB in a NAND gate 176 whose output is inverted in an inverter 178. As disclosed in the above-noted copending applications, the digit timing signal DCA is a logical one for the first digit time of each word time. The bit timing signal BCB is a logical one during the second bit time of each digit time. Thus, when both timing signals DCA and BCB are logical ones, the output of NAND gate 176 is a logical zero which is inverted to a logical one in inverter 78 for application to the gated set and reset inputs of the flip-flop OSF. When the bit timing signal BCB goes to a logical zero at the end of the second bit time of the first digit time, the output of NAND gate goes to a logical one, and a logical one to logical zero transition is developed at the output of inverter 178. When the flip-flop OCF is set by a word clock pulse $WC_0$, its set output OCF enables the gated set input of flip-flop OSF to be set by a delayed word clock pulse $DWC_0$ occurring two bit times after the occurrence of the word clock pulse $WC_0$. Flip-flop OSF is reset one word time later by the next occurring delayed word clock pulse $DWC_0$.

Thus, the operation of the flip-flop OCF is duplicated by the flip-flop OSF except delayed by two bit times. This two bit time delay compensates for the inherent playback delay, and its set output OSF is a logical one to mark the time during each revolution of the drum 20 during which a data word read from the message slot in the buffer store tracks 60 addressed by the signal OCF is available as a buffer data word output BDO for transmission to the output device 86. This logical one output OSF is used to control the output register 90 (FIGURE 1) so as to accept only the data word read from the proper message slot.

Figure 5:
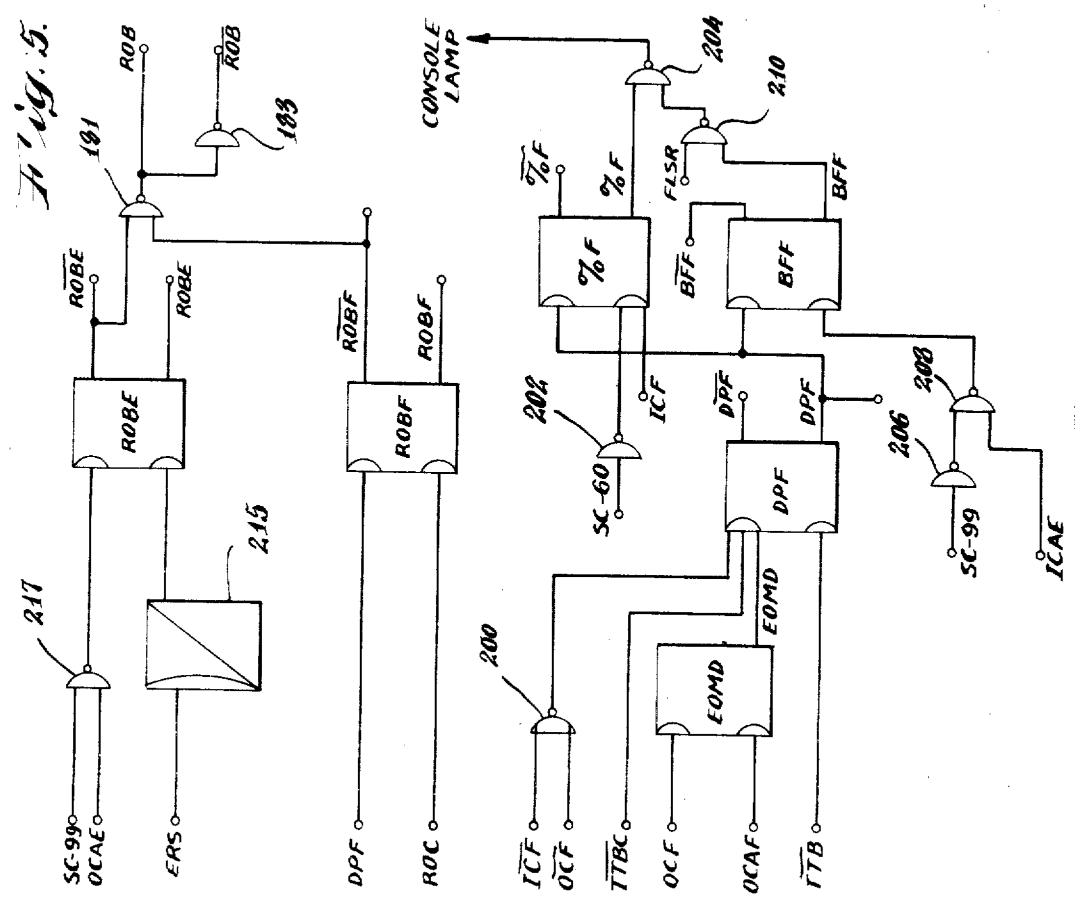
FIGURE 5 is a detailed logic block diagram of the input and output counter comparator, and a portion of the transfer out of buffer circuit, both of FIGURE 1.

To read out messages from the buffer store tracks 60 for transmission to the output device 86, a read out buffer command pulse ROC is applied to set a read out buffer flip-flop ROBF seen in FIGURE 5. Its reset output $\overline{ROBF}$ is gated through a NAND gate 181 to derive a read out buffer signal ROB and its compliment $\overline{ROB}$ inverted by inverter 183. When the flip-flop ROBF is set, the read out buffer signal enables the gated set input of an output counter advance enable flip-flop OCAE seen in FIGURE 4. During a message transfer from the buffer store tracks 60, the flip-flop OCAE is maintained in its reset condition by the reset output $\overline{OCF}$ of the output counter flip-flop OCF. After a complete message has been transferred to the output device 86, an end of message pulse EOM, generated thereat, triggers the flip-flop OCAE to its set condition. Inasmuch as the address word DAD addressing the message slot from which data words have been read out and transmitted to the output device 86 is still being recirculated in the buffer output counter 54, the next time the same address word DAD is read from the drum address track 22 (FIGURE 1) flip-flop OCAE is reset when the flip-flop OCF is set by input $\overline{OCF}$. As the flip-flop OCAE resets, its set output OCAE triggers the output counter advance flip-flop OCAF to its set condition. While flip-flop OCAF is set, its set output OCAF enables AND gate 150 to pass the next address word DAD read from the drum address track 22 after the one comparing with the recirculated address word. This next address word DAD is shifted into the buffer output counter 54. One word time later, the flip-flop OCAF is reset by a word clock pulse $WC_0$ and this next address word DAD is thereafter recirculated in the buffer output counter 54 through AND gate 156. The set output OCF of flip-flop OCF then addresses the next message slot from which a message is to be read out for transfer to the output device 86. This operation repeats automatically until the read out buffer flip-flop ROBF (FIGURE 5) is reset by operation of a data present flip-flop DPF, to be described, when the buffer store tracks 60 have been cleared of recorded messages.

Comparator 100

The comparator 100 (FIGURE 1) operating to detect when the buffer store tracks 60 have been cleared of recorded messages is shown in FIGURE 5. It will be recalled from the general description of the overall buffer storage system shown in FIGURE 1 that when the same address word is being recirculated in both the buffer input counter 52 and the buffer output counter 54 the buffer store tracks 60 are empty. In reality, this indicates that the message slot which is to accept the next message transfer from the main store track 26 is the same message slot from which a message is to be transferred to the output device 86. The data present flip-flop DPF seen in FIGURE 5 operates to detect this buffer empty condition. When the first message is to be transferred to the buffer store tracks 60, the reset output $\overline{TTB}$ of the transfer to buffer flip-flop TTB (FIGURE 3) sets the flip-flop DPF to indicate that the buffer is to receive a message. As long as the flip-flop DPF is set, the buffer contains data.

An end of message delay flip-flop EOMD is set by the set output OCAF of the output counter advance flip-flop (FIGURE 4) immediately after each new address word DAD is shifted into the buffer output counter 54. The flip-flop EOMD is then reset by the set output OCF of the output counter flip-flop OCF when, during the next drum revolution, this new address word DAD recirculated in the buffer output counter 54 compares with the same address word read from the drum address track 22. The set output EOMB provides a triggering input to the gated reset input of the data present flip-flop DPF each time the flip-flop EOMB resets. The gated reset input of the flip-flop DPF is enabled by the reset output $\overline{TTBC}$ of the transfer to buffer control flip-flop TTBC (FIGURE 3) as long as the console 42 has not signalled the buffer input logic to transfer a message from the main store tracks 26 to the buffer store tracks 60. Finally, the gated reset input of the data present flip-flop DPF is disabled by the output of a NOR gate 200 until its signal inputs $\overline{ICF}$ and $\overline{OCF}$ developed at the reset outputs of the input counter flip-flop ICF (FIGURE 3) and the output counter flip-flop OCF (FIGURE 4) are aligned in time. It will be appreciated that the outputs of flip-flops ICF and OCF are aligned in time when the same address word DAD is being recirculated in both the buffer input counter 52 and the buffer output counter 54. This situation occurs only when all of the messages transferred from the main store tracks 26 to the buffer store tracks 60 have been read out and transmitted to the output device 86. Thus, the buffer is empty. The data present flip-flop DPF signifies this fact by being reset from the set output EOMB of the flip-flop EOMB one drum revolution plus one word time after the same address word DAD recirculated in the buffer input counter 52 is read into the buffer output counter 54.

While the data present flip-flop DPF indicates whether or not there are recorded messages in the buffer which have not been outputted to the output device 86, a percent flip-flop %F and a buffer full flip-flop, both in FIGURE 5, operate to provide indications when the buffer has been filled to a certain percent of capacity and completely filled, respectively.

Assume it is desired that the flip-flop %F operates when the buffer has been filled to 60% of capacity. Assuming 100 message slots in the buffer store tracks 60, address word DAD–60 is being recirculated in the buffer input counter 52 when the buffer is filled to 60% of capacity. If the scanner output line 34 (FIGURE 1) energized in response to the address word DAD–60 being read into the address registers 30, to wit, scanner output line SC–60, is connected through an inverter 202 to the gated set input of the flip-flop %F, this flip-flop is set by the set output of the input counter flip-flop ICF when address word DAD–60 is also being recirculated in the buffer input counter 52. The set output %F of flip-flop %F, when a logical one, is gated through a NAND gate 204 to energize a lamp at the console 42 (FIGURE 1).

To detect when the buffer is filled to capacity, scanner output line SC–99 is connected through an inverter 206 to one input of a NAND gate 208. The other input to NAND gate 208 is the set output ICAE of the input counter advance enable flip-flop ICAE (FIGURE 3). The output of the NAND gate 208 sets the buffer full flip-flop BFF when the last message slot in the buffer store tracks 60 is filled. The set output BFF, when a logical one, enables a NAND gate 210 to pass a pulsating signal FLSR to the second input of NAND gate 204. The console lamp (not shown) is intermittently energized and the flashing light signals the console operator that the buffer is filled to capacity.

The reset output $\overline{BFF}$ of the buffer full flip-flop BFF is applied through an inverter 213 to the input counter advance flip-flop ICAF (FIGURE 3) forcing this flip-flop to remain reset. Thus, a new address word DAD cannot be entered into the buffer input counter as long as the flip-flop BFF is set indicating a buffer full condition.

In response to a buffer full condition, a buffer readout operation is initiated by the generation of a readout command pulse ROC applied to set the readout buffer flip-flop ROBF (FIGURE 5). The readout operation is carried out in the manner previously described in connection with the disclosed buffer output logic. Once the buffer is emptied, the data present flip-flop DPF resets to reset the flip-flops ROBF, %F, and BFF.

As was described in connection with the buffer input logic and the buffer output logic, a readout operation is initiated when a parity error is detected in the recirculated address words DAD. This is carried out under the control of a readout buffer error flip-flop ROBE seen in FIGURE 5. This flip-flop is set from the output of a delay multivibrator 215 trigger in response to a console generated error signal ERS. The reset output $\overline{ROBE}$ gated through NAND gate 181 derives the readout buffer signal ROB applied to the output counter advance enable flip-flop OCAE (FIGURE 4) to initiate a buffer readout operation as previously described. The flip-flop ROBE is reset from the output of a NAND gate 217 when the last message slot in the buffer store tracks 60 has been read out as determined by the gate inputs SC–99 (scanner line) and OCAE (set output of flip-flop OCAE). It is recommended that all of the message slots be read out regardless of the extent to which the buffer is filled when encountering a parity error indication since the operation of the data present flip-flop DPF cannot be depended upon once a parity error exists.

Buffer reset logic

When the data present flip-flop DPF of FIGURE 5 has been reset indicating that the buffer store tracks 60 have been cleared of recorded messages, its set output DPF goes through a logical one to zero (positive) transition which is passed by a permanently enabled A.C. gate 220 to the direct set input of a buffer reset flip-flop BRF seen in FIGURE 3. The buffer reset flip-flop BRF is reset by a revolution clock pulse $RC_0$ occurring at the beginning of each revolution of the drum 20. When the buffer reset flip-flop BRF is reset, its set output BRF goes through a positive signal transition which is passed through a permanently enabled A.C. gate 222 to the direct set input of the input counter advance flip-flop ICAF. Similarly, a positive signal transition of the set output BRF is passed through an enabled A.C. gate 224 to the direct set input of the output counter advance flip-flop OCAF (FIGURE 4).

It will thus be seen that the flip-flops ICAF and OCAF are set from the buffer reset flip-flop BRF at the beginning of a drum revolution when the very first address word DAD–00 is being read from the drum address track 22 (FIGURE 1). Each of these flip-flops are reset one word time later so as to enter this first address word DAD–00 into both the buffer input counter 52 and the buffer output counter 54. Consequently, the buffer storage system is reset, and the next message transferred from the main store tracks 26 to the buffer store tracks 60 is recorded in the very first message slot which is addressed by the first address word DAD–00.

The same buffer reset operation is also performed when buffer readout is initiated in response to a parity error indication. When the readout buffer error flip-flop ROBE (FIGURE 5) resets after the buffer has been cleared, its set output ROBE, gated with the error signal ERS in an AND gate 226, goes from a logical one to a logical zero, and the gate output sets the buffer reset flip-flop BRF. This flip-flop is reset by the next occurring revolution clock pulse $RC_0$ whereupon the buffer input counter 52 and the buffer output counter 54, controlled by flip-flops ICAF and OCAF, accept the address word DAD–00.

In-Out buffer track select logic

The set output HDR of the data register flip-flop HDR, operating each time a data word is read into the data register 44 from the main store tracks 26 (FIGURE 1), is applied to the gated set and reset inputs of the first flip-flop stage IA of a binary counter seen in FIGURE 6. The additional flip-flop stages of this binary counter are flip-flops IB and flip-flop IC. Each time the data register flip-flop HDR sets and then resets, the binary counter IA–IC counts one. The set outputs IA, IB and IC of this binary counter are applied as one input to each of the AND gates 252, 254 and 256. The other input to each of the AND gates 252, 254 and 256 is provided by the set output TWT of the transfer word to buffer flip-flop TWT. The outputs of AND gates 252, 254 and 256 are applied as inputs to NOR gates 258, 260 and 262. The outputs of NOR gates 258, 260 and 262, designated $\overline{X}$, $\overline{Y}$, and $\overline{Z}$, respectively, are applied to a binary to decimal decoder 264. The outputs $\overline{X}$, $\overline{Y}$, and $\overline{Z}$ are complimented in inverters 266, 268 and 270 to provide inputs X, Y, and Z, respectively, also to the binary to decimal decoder 264. The outputs of the binary to decimal decoder 264, collectively designated 272, are applied to the read/write gated amplifier 76 (FIGURE 1) so as to select the buffer store tracks 60, in sequence, in which to record data words read out from the data register 44 as a buffer data word input BDI.

It will thus be seen that each time a data word is read from a main store track 26 into the data register 44 (FIGURE 1) the binary counter IA–IC increases its count by one. When the transfer word to buffer flip-flop TWT sets to control the shifting out of this data word from the data register 44, AND gates 252, 254 and 256 are enabled, and the binary to decimal decoder 264 decodes the binary count of the binary counter IA–IC so as to control the selection of the proper buffer store track 60 in which to record the data word read out of the data register 44. Accordingly, the first transferred data word of a message is recorded in a particular message slot of a first buffer store track 60, the second transferred data word is recorded in the same message slot of a second buffer store track, etc. After a complete message transfer, the counter IA–IC is forcibly reset to zero.

Track selection for the read out of data words to the output device 86 (FIGURE 1) is also accomplished by way of the binary to decimal decoder 264. A second binary counter consisting of flip-flop stages OA, OB, and OC counts the number of next word request signals NWR received from the output device 86. The set outputs OA, OB, and OC of this binary counter are applied as one input to each of the AND gates 280, 282 and 284, respectively. The second input to each of the AND gates 280, 282 and 284 is supplied by the reset output $\overline{TWT}$ of the transfer word to buffer flip-flop TWT. The output of AND gates 280, 282 and 284 are supplied as the second input to each of the NOR gates 258, 260 and 262.

It will be seen that AND gates 280, 282 and 284 are normally energized when there is no transfer of the data words from the main store tracks 26 to the buffer store tracks 60 by way of the data register 44 in progress. Thus, the binary to decimal decoder 264 normally receives as inputs the count of the binary counter OA–OC. Thus, the outputs 272 of the binary to decimal decoder 264 normally select the buffer store track 60 from which is to be read out the next data word of a message for transmission to the output device 86. This normal output track select condition prevails until interrupted by operation of the transfer word to buffer flip-flop TWT controlling the transfer of data words from the main store tracks 26 to the buffer store tracks 60. The set output TWT of the transfer word to buffer flip-flop TWT, when a logical one, conditions the read/write gated amplifier 76 to the write mode. When the flip-flop TWT is reset the gated amplifier 76 is conditioned to the read mode. Thus, the gated amplifier 76 is normally conditioned to read and is conditioned to write only during the actual recording of a data word read out of the data register 44.

SUMMARY

The broad concept of the invention could be carried out using a buffer input counter which simply counts one each time a message is transferred into the buffer. By the same token, a buffer output counter counts one each time a message is read out of the buffer. When the counts of the two counters compare, the buffer is empty. However, counters operating in this fashion could not be used to address the buffer without providing an additional counter to count message slots during each drum revolution. When the counts of input and output counters compare with the count of the additional counter, separate signals could be generated to address the buffer for the read in and the read out of messages. The disadvantage of this is that if any one of the counters drops a count the system is completely out of synchronization. By using count words (address words) as specifically disclosed herein this drawback is avoided and an additional counter is not needed.

It will readily occur to those skilled in the art that comparators 56 and 58 (FIGURE 1) could compare address words on a parallel bit basis in which case the address words DAD would be held statically in the input and output counters rather than recirculated. Furthermore, the words processed in the disclosed system could be coded in a format other than binary coded decimal. It will be appreciated that the buffer storage system of the invention is not necessarily limited to the use of a magnetic drum data storage medium.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Apparatus for addressing a cyclical memory used as a buffer storage medium, said apparatus comprising, in combination

- A. addressing means operating in synchronism with the cyclical memory to define a predetermined plurality of data storage locations therein;
- B. a buffer input counter
  - (1) operating to count the number of data inputs stored in the cyclical memory;
- C. first circuit means
  - (1) connected to said addressing means and said input counter, and
  - (2) operating to locate during each cycle of the memory a different particular storage location for storing each next data input;
- D. a buffer output counter
  - (1) operating to count the number of data outputs read from the cyclical memory; and
- E. second circuit means
  - (1) connected to said addressing means and said output counter, and
  - (2) operating to locate during each cycle of the memory a different particular storage location storing each data input to be next read out.

2. The apparatus defined in claim 1 wherein the data is read out from the memory in the same order as received.

3. The apparatus defined in claim 1 wherein said cyclical memory is constituted by at least one circumferential data track on a magnetic drum.

4. The apparatus defined in claim 1 which further includes

- F. a comparator
  - (1) connected to compare the counts of said input and output counters, and
  - (2) operating to reset said input and output counters to zero when their counts compare.

5. The apparatus defined in claim 3 wherein said addressing means includes

- (1) a circumferential address track on the magnetic drum, said address track storing (a) a recorded address uniquely associated with each of the data storage locations in said data track, (i) the data storage locations and their associated addresses occupying corresponding relative positions in their respective drum tracks.

6. Apparatus for controlling the recording of random data inputs on a magnetic drum according to their order of receipt, said magnetic drum including at least one data track having a predetermined plurality of data storage locations, and an address track storing discrete address words, each address word uniquely associated with one of the storage locations in said data track, and said address words, when read out from said address track, serving to locate their associated data storage locations in said data track, said apparatus comprising, in combination, A. readout means reading out said address words in sequence during each revoltuion of said drum;

B. an input counter connected to said readout means, said input counter being (1) controlled to accept and hold a first address word associated with a first data storage location for the recording of the next data input;

C. a comparator for continuously comparing said first address word held in said input counter with each address word read from said address track, said comparator (1) developing a first input address signal each time said first address word is read out from said address track (a) said first input address signal serving to locate said first data storage location and control the recording therein of said next data input; and D. an address advance circuit operating in response to the recording of said next data input in said first data storage location to control said input counter to accept and hold the next address word read out in sequence after said first address word, (1) whereby said first comparator develops a second input address signal each time said next address word is read out to locate the data storage location associated therewith for the recording of the next occurring data input.

7. Apparatus for controlling the readout of data recorded on a magnetic drum according to the order as originally recorded thereon, said magnetic drum including at least one data track having a predetermined plurality of storage locations of recorded data, and an address track storing discrete address words, each address word uniquely associated with one of the data storage locations in said data track, and said address words having controlled the recording of received data in their associated storage locations according to the sequence in which read from said address track, said apparatus comprising, in combination, A. readout means reading out said address words in sequence during each revolution of said drum to successively locate their associated storage locations;

B. an output counter controlled to accept and hold a first address word associated with the data storage location of the data first recorded in said data track;

C. a comparator for continuously comparing said first address word held in said output counter with each address word read from said address track, (1) said comparator developing a first output address signal each time said first address word is read out from said address track, (a) said first output address signal serving to locate the data storage location associated with said first address word and to control the readout of the first recorded data to an output device on request; and D. an address advance circuit operating in response to the readout of said first recorded data to control said output counter to accept and hold the next address word read out, in sequence, from said address track after said first address word, (1) whereby said comparator develops a second output address signal to locate the data storage location of the data recorded next after said first recorded data.

8. A buffer data storage system comprising, in combination,

A. a magnetic drum including (1) at least one data track having a predetermined plurality of data storage locations, and (2) an address track storing discrete address words, (a) each address word uniquely associated with one of the storage locations on said data track, and (b) said address words, when read out from said address track, serving to locate their associated data storage locations in said data track;

B. readout means reading out said address words in sequence during each revolution of said drum;

C. a buffer input counter connected to said readout means, said input counter being (1) controlled to accept and hold a first address word associated with a first data storage location for the recording of a first data input;

D. a first comparator for continuously comparing said first address word held in said input counter with each address word read from said address track, said first comparator (1) developing a first input address signal each time said first address word is read out from said address track (a) said input address signal serving to locate said first data storage location and control the recording therein of said first data input;

E. a first address advance circuit operating in response to the recording of said first data input in said first data storage location to control said input counter to accept and hold the next address word read out in sequence after said first address word, (1) whereby said first comparator develops a second input address signal each time said next address word is read out to locate the data storage location associated therewith and for controlling the recording therein of the next occurring data input;

F. a buffer output counter controlled to accept and hold said first address word associated with said first data storage location of said first data input;

G. a second comparator for continuously comparing said first address word held in said output counter with address words read from said address track, (1) said second comparator developing a first output address signal each time said first address word is read out from said address track, (a) said first output address signal serving to locate said first data storage location and control the readout thereof to an output device on request;

H. a second address advance circuit operating in response to the readout of said first data storage location to control said output counter to accept and hold the next address word read out in sequence after said first address word previously held in said output counter, (1) whereby said second comparator develops a second output address signal each time said next address word is read out to locate the data storage location of the next occurring data input which is to be next read out under the control of said second output address signal to the output device on request.

9. The system defined in claim 8 wherein said address words are coded count numbers varying in numerical sequence according to their sequence of readout during each drum revolution, successive data inputs being recorded in said data storage locations according to the numerical sequence of their associated address words.

10. The system defined in claim 9 wherein the particular address word held in said input counter corresponds to the number of data inputs recorded in said data track and the particular address word held in said output counter corresponds to the number of recorded data inputs read out to the output device, the numerical difference between the contents of said in put and output counters corresponding to the number of recorded data inputs awaiting to be read out to the output device.

11. The system defined in claim 8 which further includes

I. a reset circuit connected to said first and second comparators, said reset circuit
   (1) operating in response to the simultaneous receipt of output and input address signals to condition said input and output counters to accept and hold the address word read out at the beginning of each drum revolution,
   (2) whereby to effectively clear said data track of previously recorded data.

12. The system defined in claim 11 wherein said address words are recorded and read out in serial binary bit format, (1) said first and second comparators are serial binary bit comparators, and
(2) the address words held in said input and output counters are serially recirculated therein while supplied to said first and second comparators, respectively, for concurrent comparison with each address word read from said address track.

13. The system defined in claim 12 which further includes

J. error checking circuits connected to the outputs of said input and output counters for continuously monitoring the recirculating address words for error.

14. A buffer storage system for temporarily storing messages for ultimate transmission to an output device on request, said messages each including a plurality of data words, said system comprising, in combinnation, A. a magnetic drum including
   (1) a plurality of parallel buffer storage data tracks,
      (a) one of said data tracks for storing one word of each message,
      (b) said data tracks having, in combination, a predetermined plurality of numbered message slots in which to record said messages as received,
   (2) an address track storing discrete count number words,
      (a) said count words varying in numerical sequence according to their sequence of readout during each drum revolution,
      (b) each count word being associated with a correspondingly number message slot and, when read out from said address track, serving to locate its associtad message slot;
B. readout means reading out said count words in sequence during each revolution of said drum;
C. a buffer input counter connected to said readout means, said input counter being
   (1) controlled to accept and hold the first count word associated with the first numbered message slot in which to record a first message input received in serial data word order;
D. a first comparator connected to said readout means for continuously comparing said first count word held in said input counter with each count word, said first comparator
   (1) developing a first input address signal each time said first count word is read out,
      (a) said first input address signal serving to locate the message slot in which to record said first message input;
E. input track select circuitry operating in response to the imminent arrival of each data word of said first message input to sequentially select a different data track for the recording of each data word in said first message slot under the control of said first input address signal;
F. a first address advance circuit operating in response to the recording of said first message input in said first message slot to control said input counter to accept and hold the next numbered count word read out in sequence after said first count word,
   (1) whereby said first comparator develops a second input address signal each time said next numbered count word is read out so as to locate the next numbered message slot associated therewith and control the recording therein of the next message input;
G. a buffer counter connected to said readout means, and
   (1) controlled to accept and hold said first count word associated with said first message slot storing said first message;
H. a second comparator for continuously comparing said first count word with count words read from said address track,
   (1) said second comparator developing a first output address signal each time the same count word is read out from said address track,
      (a) said first output address signal serving to locate said first message slot;
I. output track select circuitry operating in response to word requests from said output device to sequentially select a different data track for the readout of the data words of said first message under the control of said first output address signal; and
J. a second address advance circuit operating in response to the readout and tarnsmission of said first message to said output device to control said output counter to accept and hold the next numbered count word read out in sequence after said first count word,
   (1) whereby said second comparator develops a second output address signal each time said next numbered count word is read out so as to locate the next numbered message slot in which is recorded the next message to be read out under the control of said second output address signal and transmitted to said output device.

15. The system defined in claim 14 wherein said output track select circuitry is normally operative and said input track select circuitry is normally inoperative, (1) said input and output track select circuitry sharing common read/write circuitry operating in said data tracks.

16. The system defined in claim 15 wherein each of said input and output track select circuitry includes (1) binary counters operating to count the data words of a message as recorded and as read out
   (a) the counts of said binary counters controlling the data track selection.

17. The system defined in claim 14 wherein said first address advance circuit includes (1) a flip-flop triggered by an input address signal when a complete message has been recorded, and
(2) gating means controlled by said flip-flop to gate into said input counter the next numbered count word as read from said address track.

18. The system defined in claim 14 wherein said second address advance circuit includes (1) a flip-flop triggered by an output address signal after a message has been read out to the output device, and (2) gating means controlled by said flip-flop to gate into said output counter the next numbered count word as read from said address track.

19. The system defined in claim 14 which further includes

K. a reset circuit responsive to the simultaneous receipt of input and output address signals to signal said first and second address advance circuits, (1) said address advance circuits controlling said input and output counters to accept and hold the first numbered count word in the readout sequence read out at the beginning of each drum revolution, (2) whereby to effectively clear all of said message slots of recorded messages.

20. The system defined in claim 19 which further includes

L. indicator means operating when an input address signal is aligned in time with the readout of a selected one of said count words to provide an indication that a selected number of messages are recorded in said data tracks.

21. The system defined in claim 19 which further includes

L. indicator means operating when an input address signal is aligned in time with the readout of the last count word in sequence during a drum revolution to provide an indication that all of said message slots contain recorded messages.

22. A buffer storage system comprising, in combination:

A. a cyclical memory having a plurality of predetermined data storage locations therein, (1) said cyclical memory being constituted by at least one circumferential data track on a magnetic drum;

B. addressing means operating in synchronism with said cyclical memory to locate each said data storage location, said addressing means including, (1) a circumferential address track on said magnetic drum, said address track storing (a) a recorded address uniquely associated with each of the data storage locations in said data track, (i) said data storage locations and their associated addresses occupying fixed corresponding positions in their respective drum tracks;

C. buffer input circuitry (1) connected to said addressing means, and (2) operating to sequentially locate said data storage locations for storing each successive data input, and D. buffer output circuitry (1) connected to said addressing means, and (2) operating to sequentially locate said data storage locations containing stored data in preparation for the successive read-out thereof.

References Cited

UNITED STATES PATENTS

| | | | |
|---|---|---|---|
| 3,339,175 | 8/1967 | Forester et al. | 340—174.1 |
| 3,231,867 | 1/1966 | Bartlett | 340—172.5 |
| 2,978,685 | 4/1961 | Eckdahl et al. | 340—174.1 |

STANLEY M. URYNOWICZ, Jr., Primary Examiner

V. P. CANNEY, Assistant Examiner

U.S. Cl. X.R.

340—172.5

UNITED STATES PATENT OFFICE
CERTIFICATE OF CORRECTION

Patent No. 3,480,931 November 25, 1969

Ambros Geissler et al.

It is certified that error appears in the above identified patent and that said Letters Patent are hereby corrected as shown below:

Column 2, line 2, "cyclic" should read -- cyclical --. Column 3, line 43, "system" should read -- systems --. Column 4, line 64, "comprises" should read -- comprise --. Column 15, lines 5, 7, and 26, "EOMB", each occurrence, should read -- EOMD --. Column 21, line 15, "in put" should read -- input --; line 63, "number" should read -- numbered --. Column 22, line 25, after "buffer" insert -- output --; line 44, "tarnsmission" should read -- transmission --.

Signed and sealed this 27th day of October 1970.

(SEAL)
Attest:

Edward M. Fletcher, Jr. — Attesting Officer

WILLIAM E. SCHUYLER, JR. — Commissioner of Patents